(12) United States Patent
McHugh et al.

(10) Patent No.: US 12,112,310 B2
(45) Date of Patent: *Oct. 8, 2024

(54) AUTHENTICATION FOR THIRD PARTY DIGITAL WALLET PROVISIONING

(71) Applicant: Capital One Services, LLC, McLean, VA (US)

(72) Inventors: Katherine McHugh, Richmond, VA (US); Lesley Newton, Richmond, VA (US); Casey Barrett, San Francisco, CA (US); Patrick Zearfoss, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,518

(22) Filed: Mar. 9, 2023

(65) Prior Publication Data
US 2023/0281594 A1 Sep. 7, 2023

Related U.S. Application Data

(63) Continuation of application No. 16/725,435, filed on Dec. 23, 2019, now Pat. No. 11,615,395.

(51) Int. Cl.
*G06Q 20/32* (2012.01)
*G06Q 20/34* (2012.01)
(Continued)

(52) U.S. Cl.
CPC ..... *G06Q 20/3221* (2013.01); *G06Q 20/3278* (2013.01); *G06Q 20/352* (2013.01);
(Continued)

(58) Field of Classification Search
CPC ........... G06Q 20/3221; G06Q 20/3278; G06Q 20/352; G06Q 20/36; G06Q 20/38215;
(Continued)

(56) References Cited

U.S. PATENT DOCUMENTS 6,760,445 B1 * 7/2004 Schwenk ............ G06F 21/6209
380/278
7,827,115 B2 * 11/2010 Weller ................. G06Q 20/355
705/72
(Continued)

FOREIGN PATENT DOCUMENTS

| CN | 105761059 A | 7/2016 |
| JP | 2004287593 A | 10/2004 |

(Continued)

OTHER PUBLICATIONS

Author Unknown, "EMV Payment Tokenization Primer and Lessons Learned" Jun. 30, 2019 Whole document especially 6.6.1 Customer Confusion and Merchant Process Issues; URL https://www.uspaymentsforum.org/wp-content/uploads/2019/06/EMV-Payment-Tokenization-Primer-Lessons-Learned-FINAL-Jun. 2019.pdf.

*Primary Examiner* — Neha Patel
*Assistant Examiner* — Jahed Ali
(74) *Attorney, Agent, or Firm* — KDW FIRM PLLC

(57) ABSTRACT

Various embodiments are directed to securely verifying an identity of a user who is requesting to add or link a financial instrument to a third-party digital wallet using one-tap contactless card authentication. The financial instrument may be added or linked to the third-party wallet in at least two scenarios: pull provisioning and push provisioning. In either provisioning scenarios, the user may be required to authenticate the financial instrument being added or linked by successfully verifying the identity of the user via the one-tap contactless card authentication at a banking application associated with the financial instrument.

20 Claims, 11 Drawing Sheets

(51) Int. Cl.
  *G06Q 20/36* (2012.01)
  *G06Q 20/38* (2012.01)
  *G06Q 20/40* (2012.01)

(52) U.S. Cl.
  CPC ....... *G06Q 20/36* (2013.01); *G06Q 20/38215* (2013.01); *G06Q 20/4014* (2013.01)

(58) Field of Classification Search
  CPC ............. G06Q 20/4014; G06Q 20/326; G06Q 20/3263; G06Q 20/3672; G06Q 20/3674; G06Q 20/3829; G06Q 20/354; G06Q 20/356
  See application file for complete search history.

(56) References Cited

U.S. PATENT DOCUMENTS

| | | | | |
|---|---|---|---|---|
| 8,423,466 | B2* | 4/2013 | Lanc | G06Q 20/4014 705/35 |
| 9,953,311 | B2* | 4/2018 | Flurscheim | G06K 19/06112 |
| 10,389,533 | B2* | 8/2019 | Le Saint | H04L 9/321 |
| 10,496,705 | B1* | 12/2019 | Irani | H04L 51/18 |
| 10,554,411 | B1* | 2/2020 | Ashfield | H04L 9/3234 |
| 10,615,969 | B1* | 4/2020 | Griffin | H04L 9/0877 |
| 10,942,625 | B1* | 3/2021 | Li | G09G 5/14 |
| 10,990,964 | B1* | 4/2021 | Kurani | G06Q 20/36 |
| 2003/0042301 | A1* | 3/2003 | Rajasekaran | G06Q 20/04 235/380 |
| 2006/0109982 | A1* | 5/2006 | Puiatti | H04N 7/163 348/E7.056 |
| 2008/0223918 | A1* | 9/2008 | Williams | G06Q 20/20 235/379 |
| 2009/0143104 | A1* | 6/2009 | Loh | G06Q 20/352 340/10.1 |
| 2013/0054454 | A1* | 2/2013 | Purves | H04L 67/306 705/41 |
| 2013/0073365 | A1* | 3/2013 | McCarthy | G06Q 20/20 705/26.35 |
| 2013/0151292 | A1* | 6/2013 | Van Deloo | G06Q 10/02 705/5 |
| 2013/0159154 | A1* | 6/2013 | Purves | G06Q 20/363 705/35 |
| 2013/0198066 | A1* | 8/2013 | Wall | G06Q 20/3278 705/41 |
| 2014/0040139 | A1* | 2/2014 | Brudnicki | G06Q 20/3224 705/44 |
| 2014/0074655 | A1* | 3/2014 | Lim | G06Q 20/3265 705/26.1 |
| 2014/0108263 | A1* | 4/2014 | Ortiz | G06Q 20/36 705/44 |
| 2014/0161258 | A1* | 6/2014 | Yang | H04W 12/03 380/270 |
| 2014/0365363 | A1* | 12/2014 | Knudsen | G06Q 20/3674 705/41 |
| 2015/0019417 | A1* | 1/2015 | Andrews | G06Q 20/363 705/41 |
| 2015/0032635 | A1* | 1/2015 | Guise | G06Q 20/409 705/72 |
| 2015/0154595 | A1* | 6/2015 | Collinge | H04W 12/041 705/71 |
| 2015/0156176 | A1* | 6/2015 | Collinge | H04L 63/0428 713/168 |
| 2016/0253652 | A1* | 9/2016 | Je | G06Q 20/382 705/39 |
| 2016/0307186 | A1* | 10/2016 | Noë | G06Q 20/204 |
| 2016/0309323 | A1* | 10/2016 | Zarakas | G06Q 20/3829 |
| 2016/0364721 | A1* | 12/2016 | Deliwala | G06Q 20/36 |
| 2017/0068953 | A1* | 3/2017 | Kim | G06Q 20/3278 |
| 2017/0104725 | A1* | 4/2017 | Acharya | H04L 43/00 |
| 2018/0158052 | A1* | 6/2018 | Tseretopoulos | G06Q 20/38215 |
| 2018/0204195 | A1* | 7/2018 | Kang | G06Q 20/36 |
| 2018/0211248 | A1* | 7/2018 | Sims | G06Q 20/3221 |
| 2018/0253705 | A1* | 9/2018 | Spector | G06Q 20/102 |
| 2018/0341937 | A1* | 11/2018 | Kim | G06Q 20/4014 |
| 2019/0087814 | A1* | 3/2019 | Lassouaoui | G06Q 20/3674 |
| 2019/0288998 | A1* | 9/2019 | Johansson | H04L 63/0281 |
| 2019/0295054 | A1* | 9/2019 | Purves | G06Q 20/227 |
| 2019/0333055 | A1* | 10/2019 | Mohammed | H04L 9/3234 |
| 2019/0385152 | A1* | 12/2019 | Eu | G06Q 20/3274 |
| 2019/0385164 | A1* | 12/2019 | Royyuru | G06Q 20/36 |
| 2020/0151689 | A1* | 5/2020 | Dao | G06Q 20/105 |
| 2020/0302436 | A1* | 9/2020 | Ilincic | G06Q 20/352 |
| 2021/0081916 | A1* | 3/2021 | Rizvi | G06Q 20/387 |
| 2021/0149693 | A1* | 5/2021 | Yang | G06Q 50/01 |
| 2021/0192519 | A1* | 6/2021 | Mchugh | G06Q 20/352 |

FOREIGN PATENT DOCUMENTS

| | | | | |
|---|---|---|---|---|
| JP | | 2019525296 A | 9/2019 | |
| WO | WO-2018012836 | A1 * | 1/2018 | ............ G06K 19/06 |
| WO | WO-2018125689 | A1 * | 7/2018 | ........... G06Q 20/027 |

* cited by examiner

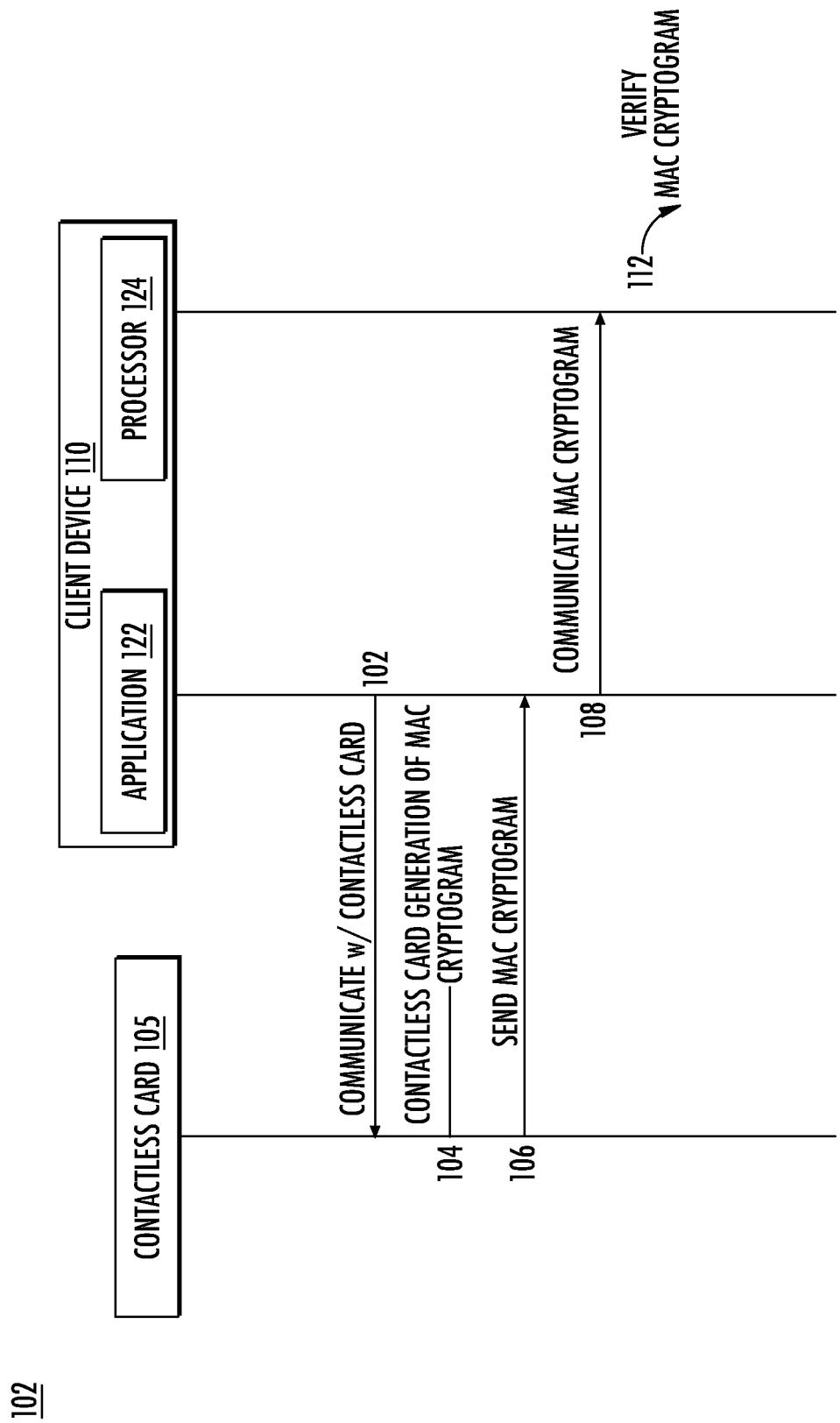

AUTHENTICATION FOR THIRD PARTY DIGITAL WALLET PROVISIONING

CROSS-REFERENCE TO RELATED APPLICATIONS

This application is a continuation of U.S. patent application Ser. No. 16/725,435 filed on Dec. 23, 2019, this disclosure of which is incorporated herein by reference in its entirety.

BACKGROUND

A digital wallet refers to an electronic device or online service that allows an individual to make electronic transactions, such as purchasing items online with a computing device, using a smartphone to make purchases at a store, etc. Typically, various types of payment instruments, e.g., bank account, debit card, credit card, are added or linked to the digital wallet. When making an in-store purchase, for example, credentials associated with the individual's preferred payment instrument may be passed to a merchant's terminal wirelessly via near field communication (NFC).

There are, however, many security-related challenges associated with digital wallets, one of which may be ensuring that the individual is the one who is actually using the payment instrument. For example, a fraudster may use stolen card or identity information to fraudulently add or link a payment instrument to make unauthorized purchases. Accordingly, there is a need for properly verifying the identity of and authenticating the individual adding or linking the payment instrument to the digital wallet in an effective and robust manner.

SUMMARY

Various embodiments are directed to securely verifying an identity of a user who is requesting to add or link a financial instrument to a third-party digital wallet using one-tap contactless card authentication. The financial instrument may be added or linked to the third-party wallet in at least two scenarios: pull provisioning and push provisioning. In either provisioning scenarios, the user may be required to authenticate the financial instrument being added or linked by successfully verifying the identity of the user via the one-tap contactless card authentication at a banking application associated with the financial instrument.

BRIEF DESCRIPTION OF THE DRAWINGS

FIG. 1B illustrates an example sequence diagram for providing authenticated access in accordance with one or more embodiments.

DETAILED DESCRIPTION

Figure 1A:
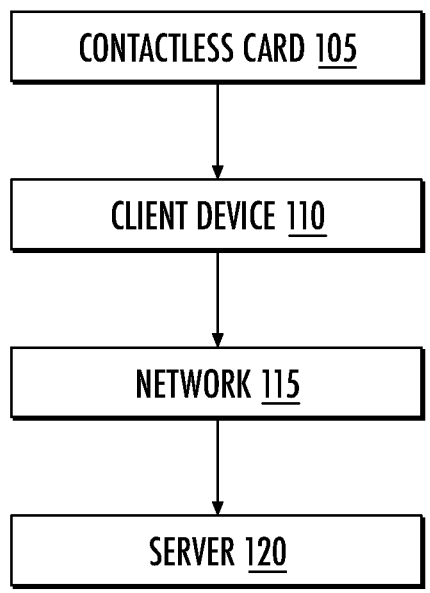
FIG. 1A illustrates an example data transmission system in accordance with one or more embodiments.

Various embodiments are generally directed to verifying an identity of a user attempting to add or link a financial instrument (e.g., a credit card) to a third-party digital wallet via one-tap contactless card authentication. In examples, the user may request to add or link the financial instrument in at least two scenarios: pull provisioning and push provisioning.

In pull provisioning, for instance, the user may request that the financial instrument be added or linked first at a third-party wallet application. The third-party wallet application may provide the user at least the option of verify the financial instrument via a banking application (e.g., first-party wallet) associated with the financial instrument. If the banking application option is selected, the user may then be directed or transitioned from the wallet application to the banking application, where the user can perform one-tap contactless card authentication to complete the user identity verification process. Upon successfully verifying the user's identity, the user may then be transitioned back to the third-party wallet application, where the financial instrument may now be added or linked and ready for use.

In push provisioning, the user may start at the banking application, such as a first-party wallet application (as opposed to the third-party wallet application), and request that a credit card be added or linked to the third-party wallet. The user can perform the one-tap contactless card authentication at the banking application. Upon successfully verifying the user's identity, the user may then be transitioned from the banking application to the third-party wallet application, where the financial instrument may be added or linked and ready for use.

As will be further described below, one-tap contactless card authentication is a highly secure way of verifying user identity. According to examples, the user may place, tap, or bring near the contactless card to a designated area of a user computing device (e.g., smartphone). The user computing device may detect the contactless card via near field communication (NFC) and receive one or more cryptograms from the contactless card. Information contained in the cryptogram(s), which may identify the true owner of the contactless card, may be compared or matched against authentication information related to the user signed-in to the banking app. If they match, a successful user identity verification can be confirmed.

In previous solutions, mechanisms for verifying whether the financial instrument being added or linked to a third-party digital wallet actually belongs to the person requesting it were typically implemented by the third-party wallet providers. As described above, these mechanisms were insecure and allowed fraudsters to add, link, and otherwise use financial instruments in fraudulent ways. The embodiments and examples described herein overcome and are advantageous over the previous solutions in that the verification process is performed by the institution associated with the financial instrument being added to the third-party wallet using highly secure techniques for authenticating the user, such as one-tap contactless card authentication.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
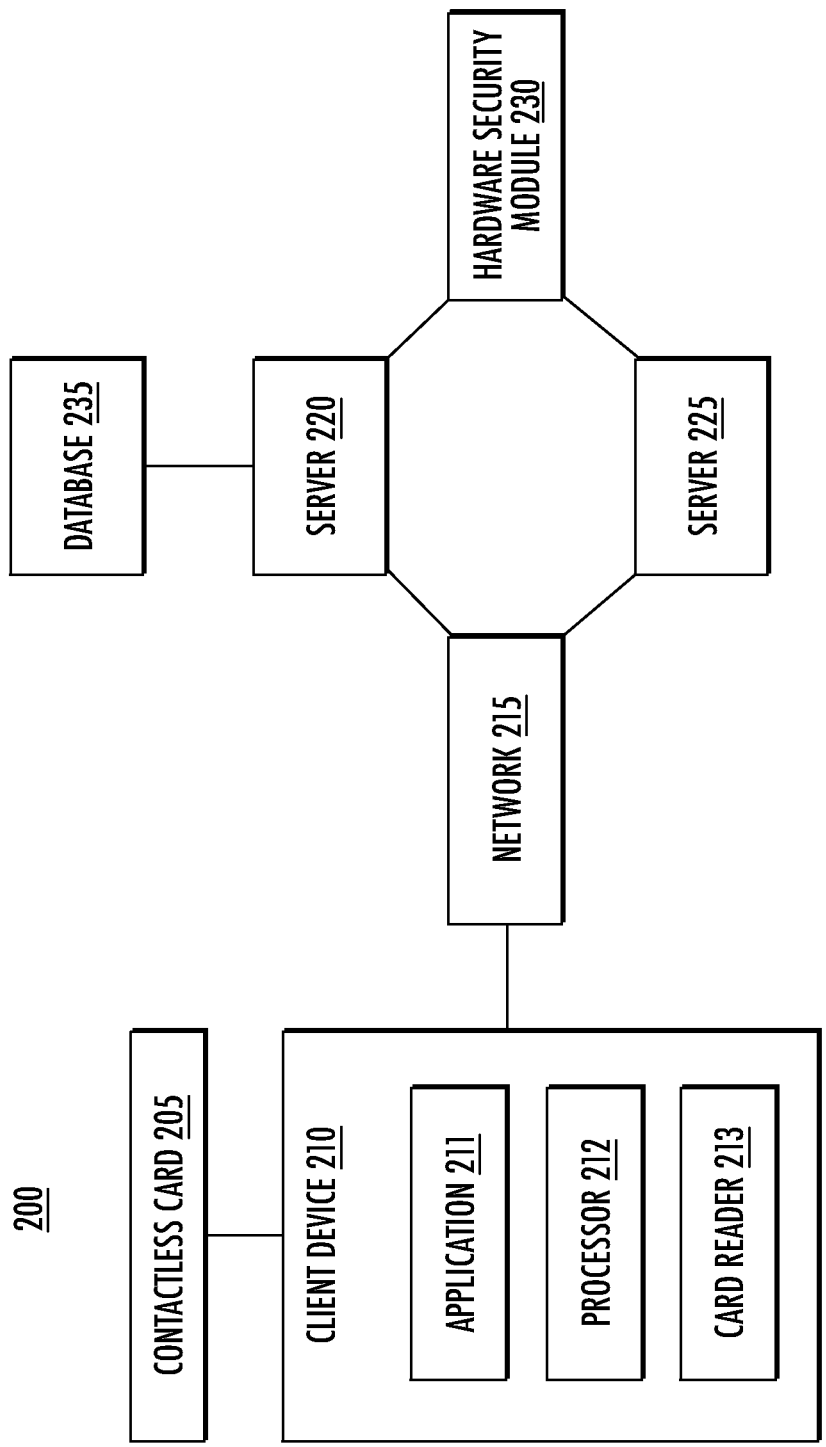
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC communication, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
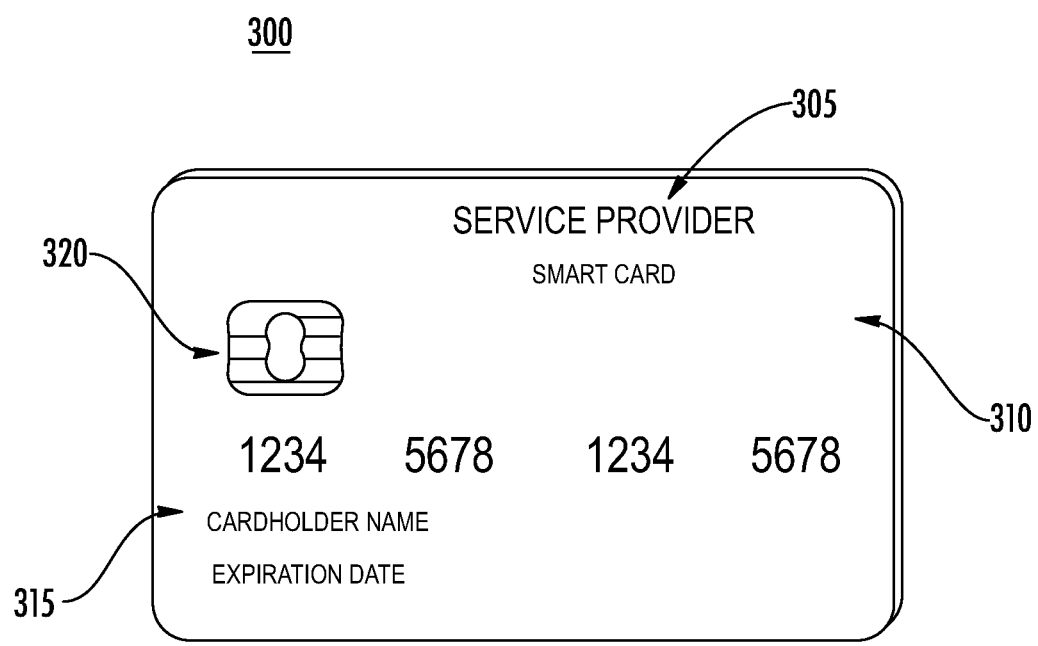
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
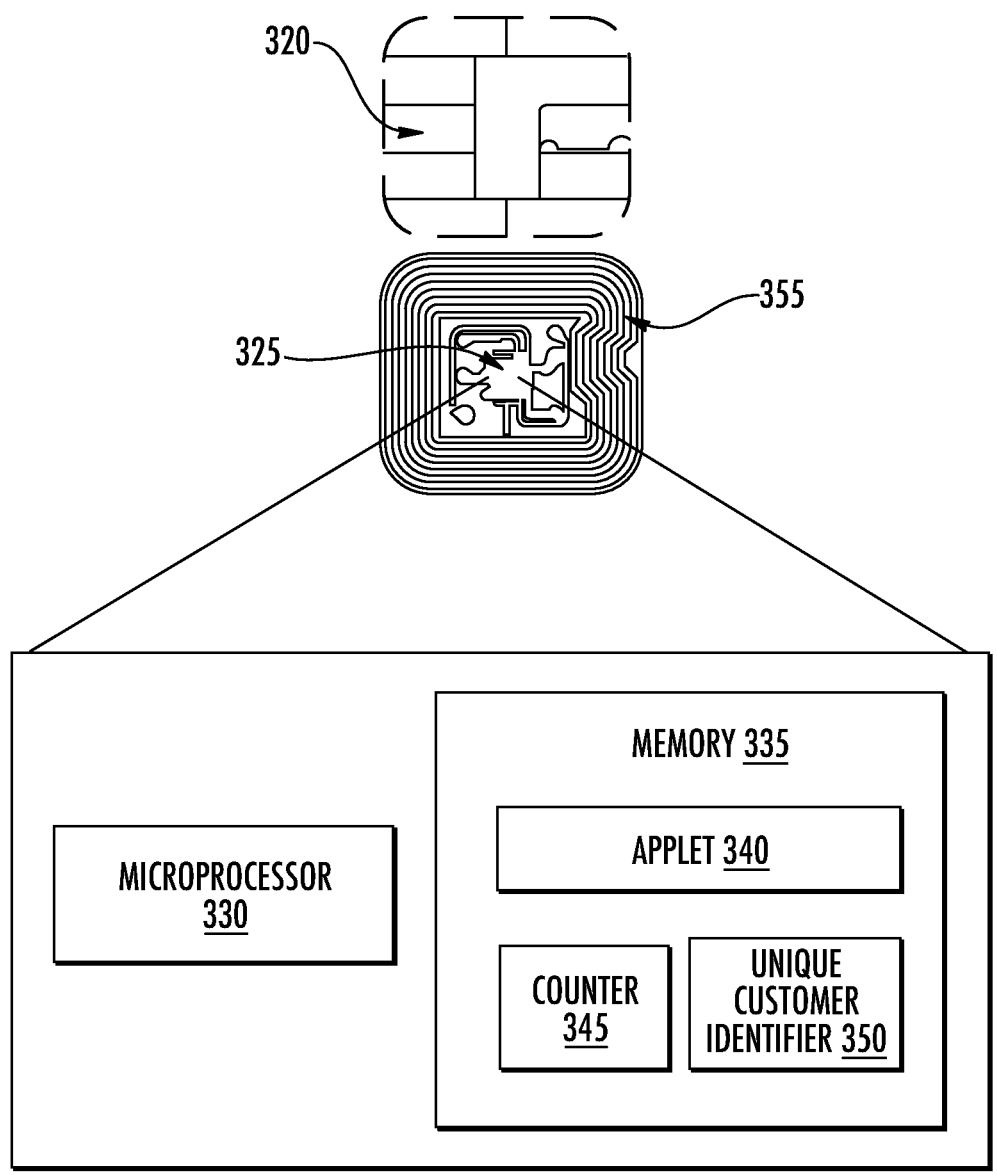
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, and a customer identifier 350. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

Figure 4:
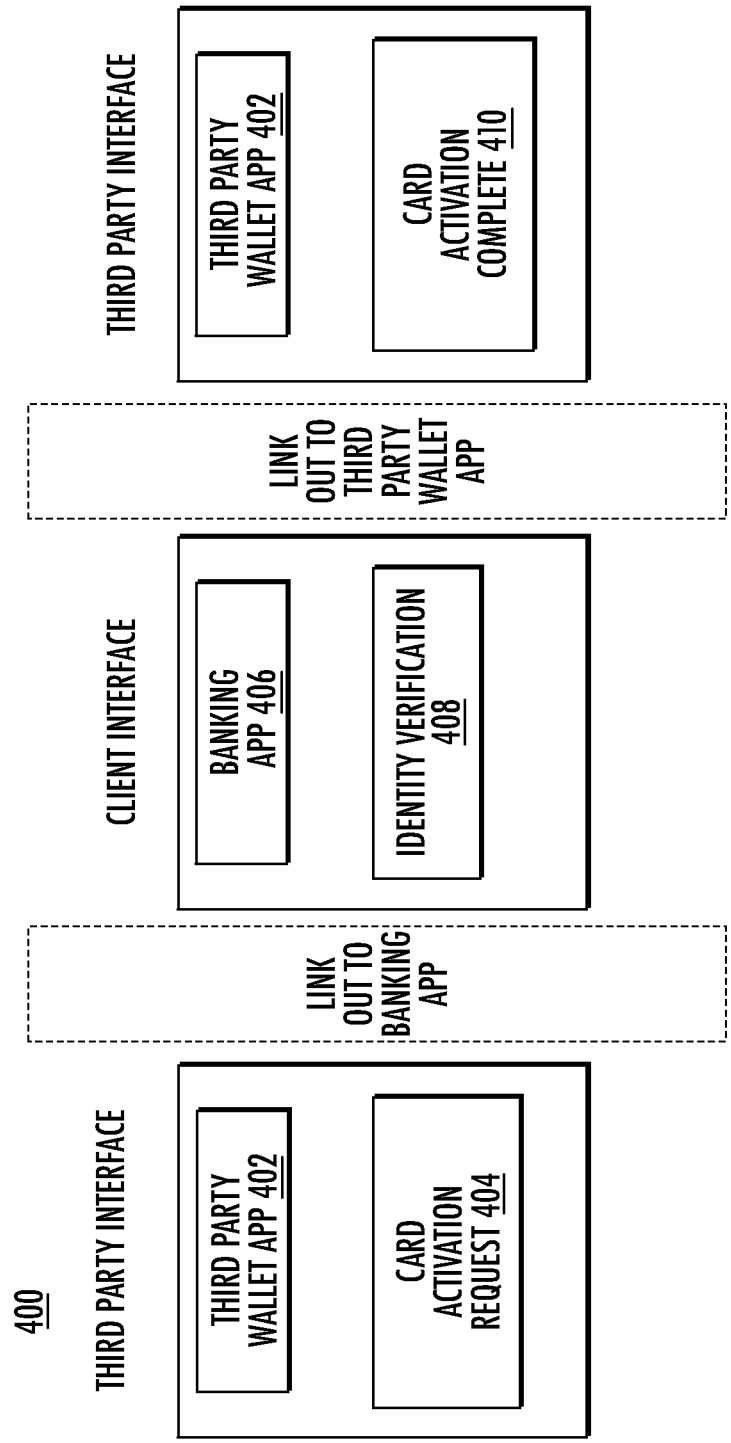
FIG. 4 illustrates an example third-party wallet pull provisioning process in accordance with one or more embodiments.

FIG. 4 illustrates an example third party wallet pull provisioning process 400 according to one or more embodiments. As shown, the pull provisioning process may begin at a third-party wallet application 402. It may be understood that the term "application" is a software application and may otherwise be referred to as an "app." For example, a user may login to the user's digital wallet via the third-party wallet application 402 and request one or more cards be added or linked thereto by selecting or pressing a card activation request icon 404. Upon selecting or pressing the card activation request icon 404, the third-party wallet application 402 may perform card verification, e.g., verify that the card is a legitimate payment instrument, verify that the card actually belongs to the user, etc.

In examples, the user may be provided an option to perform card verification via a banking application 406. When the banking application option is selected, the banking application 406 may be opened, where the user can perform identity verification 408, for example via one-tap contactless card authentication, as will be further described below. When the identity of the user has been verified, the third-party wallet application 402 may then be reopened and an indication 410 that the card has been successfully activated may be displayed.

Accordingly, it may be understood that the pull provisioning process involves at least transitioning from a first software application (e.g., a third-party wallet app interface) to a second software application (e.g., a client banking app interface, a first-party wallet app interface) (which may otherwise be referred to as "linking out" to the second software application) then transitioning from the second software application back to the first software application (or "linking out" to the first software application). It may be understood that the first software application may be a mobile-based application, a native application, a web application, or a web browser. It may also be understood that the second application a mobile-based application, a native application, a web application, or a web browser.

Figure 5:
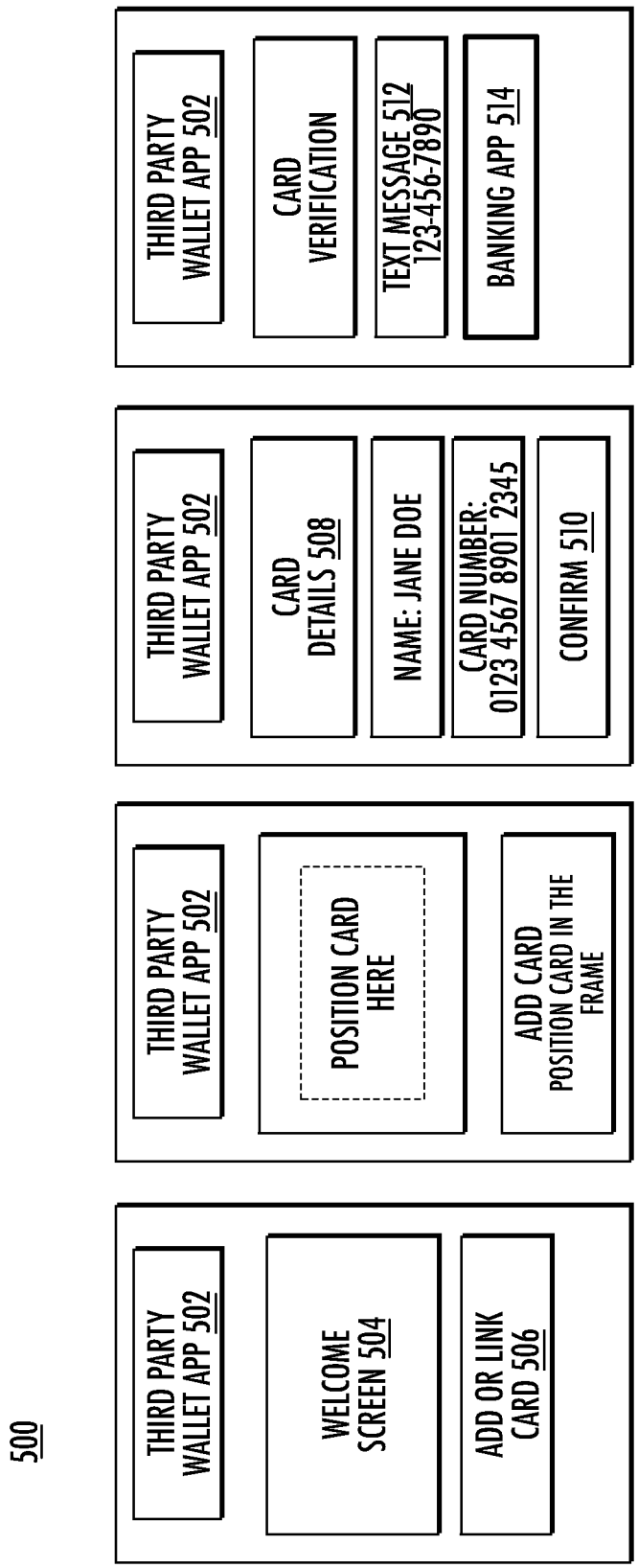
FIG. 5 illustrates an example card verification flow in accordance with one or more embodiments.

FIG. 5 illustrates an example card verification flow 500 via a third-party wallet app or interface according to one or more embodiments. It may be understood that the card verification flow 500 is part of the third-party wallet pull provisioning process. A user may login to the user's digital wallet via a third-party wallet app 502. As illustrated, upon logging in, at least a welcome screen 504 and an icon 506 for adding or linking one or more cards may be displayed. The user may select or press icon 506 to add or link a financial instrument, such as a credit card or any suitable payment card.

Upon selecting or pressing the add or link icon 506, instructions for inputting information associated with the financial instrument may be provided. As shown, the computing device may allow the user to capture a digital image of the instrument (e.g., front of credit card, back of credit card) by positioning, for example, the instrument within the "position card here" box and by selecting or pressing the "add card" icon. It may be understood that other suitable methods of inputting the card information may be provided, e.g., the user manually entering the card information, etc.

After inputting the information associated with the financial instrument, the third-party wallet app 502 may display the received information to the user for confirmation. For example, various card details 508 may be displayed, such as the type of card (e.g., debit, credit), account balance, available credit, etc. As further shown, other types of information related to the financial instrument may be displayed, including but not limited to the cardholder's (e.g., the user's—Jane Doe) name, card number (e.g., 0123456789012345), or the like. Upon reviewing the displayed card information, the user may select or press the confirm icon 510 to confirm the information.

Thereafter, the third-party wallet app 502 may provide the user one or more card verification options. As illustrated, for example, the user may be given the option to perform card verification by way of text message 512 to the user's number 123-456-7890, which may involve the user receiving a temporary code via the text message and the user inputting that temporary code to the third-party wallet app 502 to complete the verification process. Moreover, the user may be given the option to perform card verification by way of a banking app 514. As will be further described below, the banking app 514 may allow the user to perform at least one-tap contactless card authentication to verify the user's identity to complete the card verification process.

Figure 6:
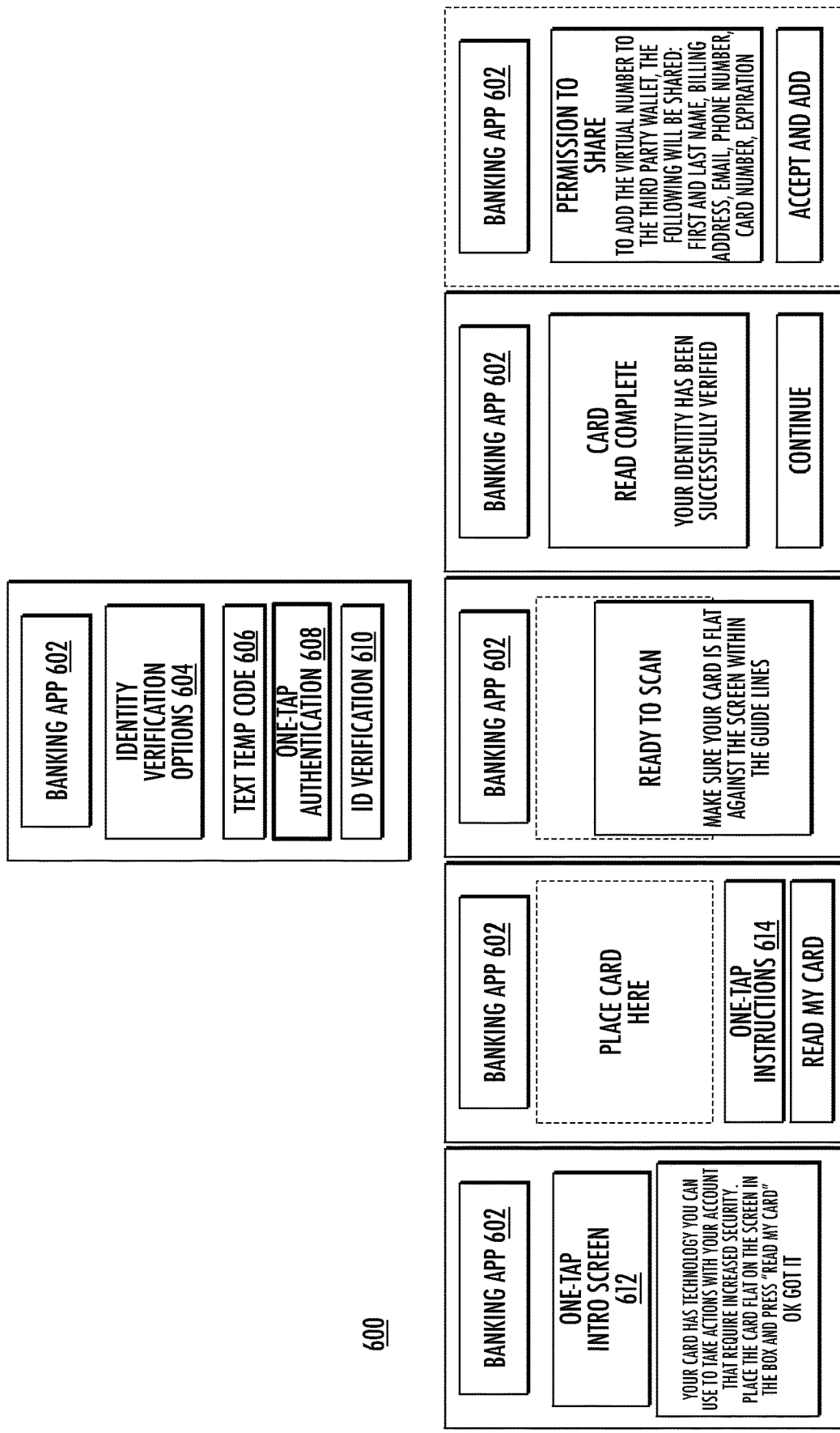
FIG. 6 illustrates an example user identity verification flow in connection with a third-party wallet pull provisioning process in accordance with one or more embodiments.

FIG. 6 illustrates an example user identity verification flow 600 in connection with a third-party wallet pull provisioning process according to one or more embodiments. It may be understood that the user identity verification flow 600 may begin, for example, upon the user selecting or pressing the banking app card verification icon at the third-party wallet app, such as the banking app icon 514 shown in FIG. 5.

Upon the user selecting the banking app card verification option, a transition may occur from the third-party wallet app to a banking app 602. In examples, once transitioned, the banking app 602 may require the user to sign-in to the user's account. The banking app 602 may receive log-in information from the user and determine whether access should be granted or denied based on the log-in information. Upon successfully logging in to the user's account, the banking app 602 may display one or more user identity verification options, e.g., text temporary code 606, one-tap contactless card authentication 608, ID card verification 610, as shown. If the text temporary code 606 option is selected, the user may receive a text containing a temporary code, which may then be input by the user to the banking app 602 to complete the identity verification process. If the user ID card verification 610 option is selected, the banking app 602 may take a photo or receive a digital image of a government ID belonging to the user, such as a driver's license, information from which may then be compared to existing user information to complete the identity verification process.

As illustrated in FIG. 6, the user selects the one-tap contactless card authentication 608 option. Upon selection, the banking app 602 may display a one-tap introduction screen 612 and related background information to situate the user for performing the one-tap authentication. For example, the background information may state that the user's contactless card has technology that can be used to take actions that require increased security and further indicate that the card may be placed flat on the screen of the computing device to proceed with the authentication process. The user may select or press the "OK got it" icon to continue.

In examples, upon the user selecting or pressing the "OK got it" icon, the banking app 602 may then display a designated area, which is outlined by the dashed box, where the user can place or tap a contactless card. It may be understood that the contactless card may be similar or identical to the contactless card 300 described above. It may further be understood that the financial instrument that the user is attempting to add or link to the third-party digital wallet may be the contactless card itself, which may be a payment card. Moreover, one-tap authentication instructions 614 may be displayed, or alternatively, an icon or link to the one-tap instructions 614 may be provided. The instructions 614 may include at least step-by-step directions for performing the one-tap authentication. For example, the user may be instructed to select or press the "read my card" icon and then to place or tap the contactless card within the dashed guide lines of the "place card here" box. It may be understood that the placement or positioning of the contactless card for performing the one-tap authentication may not be limited to the front of the user computing device, but the user may be prompted to place or position the contactless card behind the device or anywhere near an NFC reader of the device. When the "read my card" icon is pressed, the banking app 602 may further display an indication that the user's contactless card is ready to scan. In some examples, if the computing device is unable to read the contactless card via NFC, the banking app 602 may instruct the user to retry the card scan.

According to embodiments, when the user computing device detects the contactless card via NFC, the computing device may receive one or more cryptograms from the contactless card. It may be understood that a cryptogram may broadly refer to any encrypted text, data, or information. It may further be understood that the one or more cryptograms may be received as NFC data exchange format (NDEF) messages.

In examples, the one or more received cryptograms may contain information at least identifying the user or other related information indicating that the card belongs to a particular user, which may be referred to as "card-user information." For instance, the card-user information may be any type of data or information (e.g., ID number, customer number, etc.) associating the contactless card to the user, which may be created or established when the contactless card is created for the user and/or at backend systems when the user signs up or applies for the contactless card. Afterwards, the information contained in the one or more received cryptograms may be matched or compared against authentication information associated with the user to verify the identity of the user. The authentication information is any type of data or information identifying the user signed-in to the banking app (e.g., ID number, customer number, etc.).

In one example, the banking app 602 may be configured to decrypt the one or more cryptograms received from the contactless card using at least one key (e.g., a private key, a decryption key, a key corresponding to a specific encryption-decryption scheme). The banking app 602 may securely access or receive authentication information related to the user from one or more remote computing devices, such as backend servers. The authentication information may contain at least an identifier or any information indicating the identity of the user logged into the banking app 602. The banking app 602 may then determine whether the received authentication information and the decrypted cryptogram information received from the contactless card match to verify that the contactless card actually belongs to the user and/or to verify that the user is actually the user claims to be.

In another example, the banking app 602 may receive the one or more cryptograms from the contactless card and send the cryptogram(s) to one or more remote computing devices, which may be secure backend servers, to perform the decryption of the cryptograms and determine whether the information contained in the one or more cryptograms match authentication information related to the user. The one or more remote computing devices may then send to banking app 602 an indication or confirmation of verification of the user's identity. In at least that regard, most (if not all) of the identity verification process may be performed at one or more secure and remote computing devices, which may be advantageous in certain applications or use cases.

Upon successful verification and authentication of the user's identity, the banking app 602 may display an indication that the contactless card has been read and the identity of the user has been successfully verified. The user may select or press the "continue" icon to continue the verification process.

In some examples, the banking app 602 may ask the user for permission to share user-related data with the third-party wallet, such as the user's first name, middle name, last name, billing address, email address, phone number(s), card number(s), card expiration information, etc. Moreover, in additional examples, the user may be prompted to accept one or more terms and/or conditions related to adding or linking the one or more financial instruments to the third-party wallet. The user may select or press the "accept and add" icon, as shown, to proceed with adding or linking the financial instrument (which may be the contactless card, as described above). Thereafter, the user may be transitioned from the banking app 602 back to the third-party wallet app, where the financial instrument is ready for use.

Figure 7:
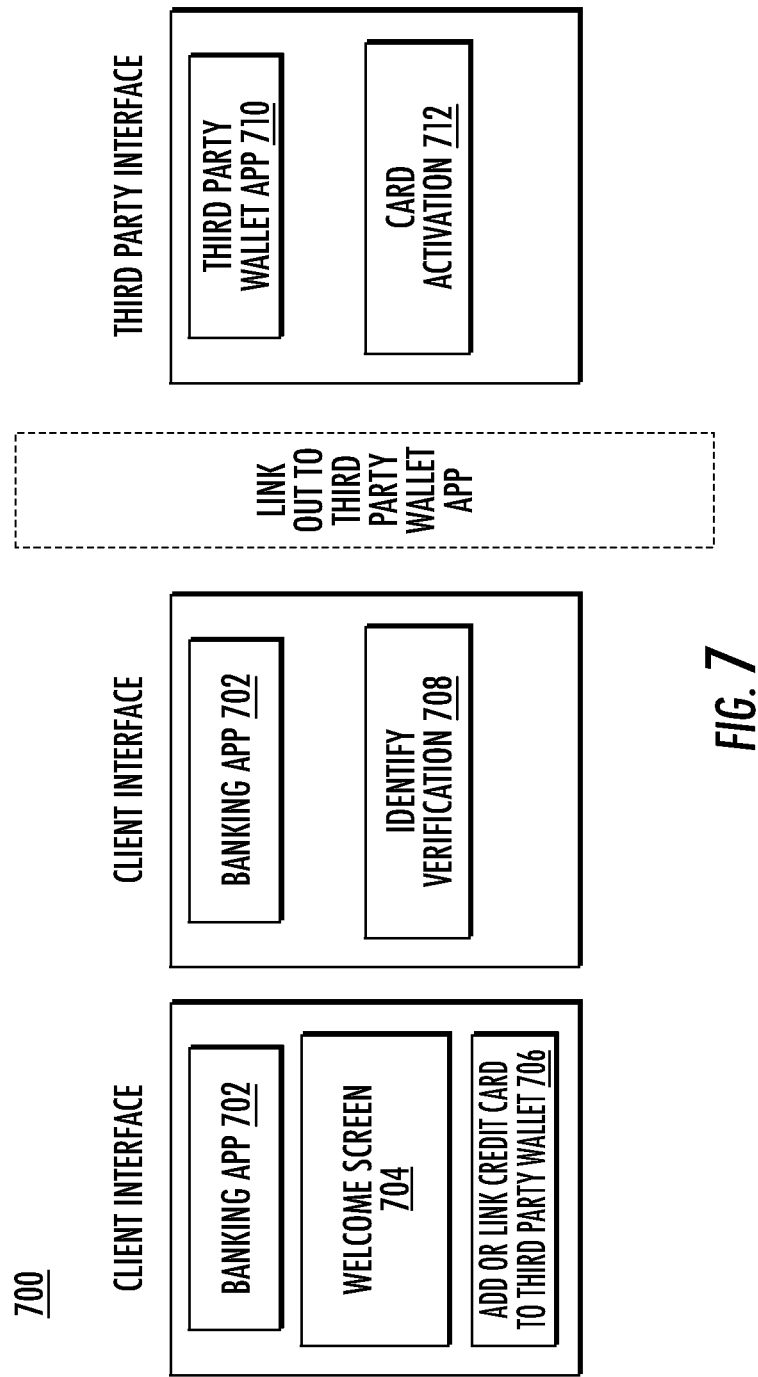
FIG. 7 illustrates an example third-party wallet push provisioning in accordance with one or more embodiments.

FIG. 7 illustrates an example third party wallet push provisioning process 700 according to one or more embodiments. For example, the push provisioning process 700 may be different from the pull provisioning process 400 shown in FIG. 4 in that the request to add or link a financial instrument to a third-party digital wallet may be initiated at the client interface (e.g., banking app 702, first-party digital wallet) as opposed to the third-party interface (e.g., third-party wallet app 402).

As shown in FIG. 7, the user may login to the banking app 702, which, upon successful user login, may display a welcome screen 704 and at least an icon 706 for adding or linking one or more financial instruments (e.g., credit card) to a third-party digital wallet. Upon selecting icon 706, the user may be prompted to select one or more financial instruments to add or link to the third-party wallet and further required to perform identity verification 708 (e.g., one-tap contactless card verification) via the banking app 702. As described above, the financial instrument that the user wishes to add or link to the third-party wallet may be the contactless card.

Upon successful verification of the user's identity, the banking app 702 may then transition or link out to a third-party wallet app 710, where at least confirmation of the successful identity verification may be shared with the third-party wallet app 710. Thereafter, the third-party wallet app 710 may display a graphic or indication 712 stating that the one or more financial instruments have been successfully activated in the third-party wallet. Accordingly, the push provisioning process 700 involves a one-way transition from the client interface to the third-party interface, as shown.

Figure 8:
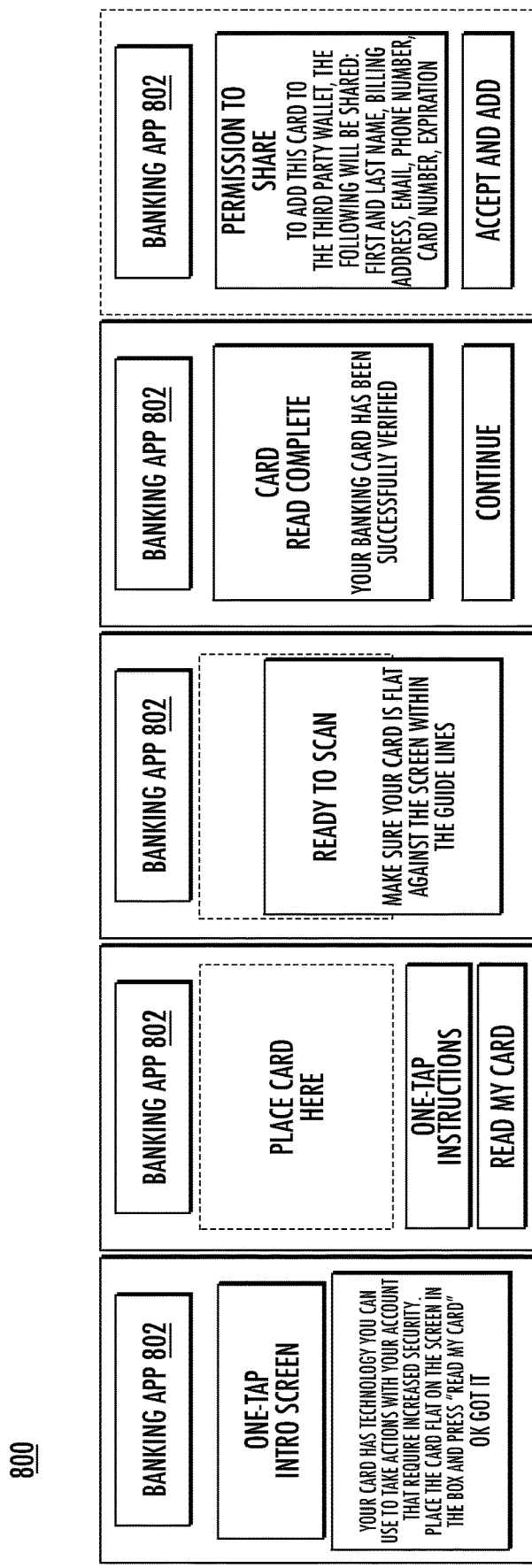
FIG. 8 illustrates an example of user identity verification flow in connection with a third-party wallet push provisioning process in accordance with one or more embodiments.

FIG. 8 illustrates an example user identity verification flow 800 in connection with a third-party wallet push provisioning process according to one or more embodiments. Thus, the user identity verification flow 800 occurs at the client interface (e.g., banking app) prior to transitioning or linking out to a third-party interface (e.g., third-party wallet app).

As shown, the user identity verification flow 800 may be substantially similar to the identity verification flow 600 illustrated in FIG. 6. The banking app 802 may allow the user to perform one-tap authentication by placing, tapping, or bringing near a contactless card (similar to the contactless card 300 described above) to the displayed "place card here" guide lines. As set forth above, information contained in the one or more cryptograms received from the contactless card may be compared to or matched against user authentication information that may be provided by one or more secure backend server computing devices. And upon successful identity verification, the banking app 802 may share not only the confirmation of the successful identity verification with the third-party wallet app, but may also share other types of information, such as the user's first, middle, last names, billing address, email address, phone numbers, card numbers, card expiration dates, card codes, etc., when the user gives permission to do.

Figure 9:
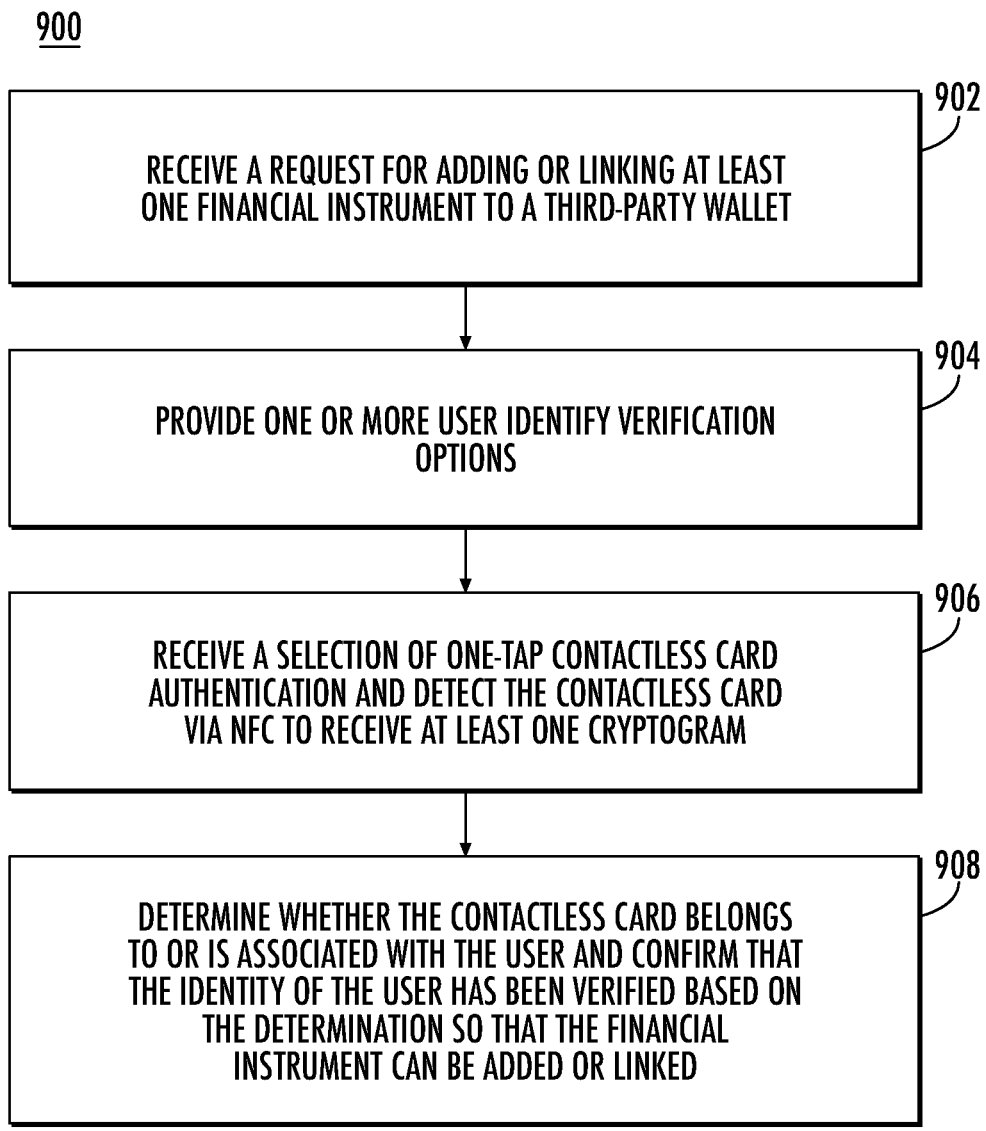
FIG. 9 illustrates an example flow diagram in accordance with one or more embodiments.

FIG. 9 illustrates an example flow diagram 900 according to one or more embodiments. The flow diagram 900 is related to authenticating and confirming the identity of the user requesting to add or link one or more financial instruments to a third-party digital wallet. It may be understood that the blocks of the flow diagram 900 and the features described therein are not required to be performed in any particular order. Moreover, it may be understood that the flow diagram 900 and the features described therein may be executed or supported by one or more processors.

At block 902, a request may be received from a user for adding or linking at least one financial instrument (e.g., a credit card, a debit card, a contactless card, any suitable payment card) to a third-party digital wallet. As described above, in pull provisioning scenarios, the request may be initiated at a third-party wallet app. Moreover, in push provisioning scenarios, the request may start at a client interface via a banking app.

Upon receiving the request to add or link the one or more financial instruments, verification of the instrument being added may be performed. In examples, the instrument verification process may be completed via one or more identity verification options, which may be provided by the banking app at block 904. The verification options may include at least one-tap contactless card authentication. As described above, the identity verification process may be performed by or carried out at the banking app.

At block 906, a selection of the one-tap authentication option may be received by the banking app and it may be determined whether a contactless card is detected via an NFC reader. Upon successful detection of the contactless card, one or more cryptograms from the contactless card may be received.

At block 908, using the received one or more cryptograms, it may be determined whether the contactless card actually belongs to or is associated with the user. As described above, the cryptogram(s) may be decrypted by the user computing device via the banking app and matched against authentication information related to the user, which may be received from one or more secure, remote computing devices (e.g., server computers). In another example, the cryptogram(s) may be sent to the one or more secure, remote computing devices, where the decryption of the cryptograms and the matching of the information contained therein to the user authentication information may be performed at the remote computing devices. Based on this determination, the verification of the user's identity may be confirmed. Thereafter, the user identity verification confirmation may be sent to the third-party wallet app to complete the card verification process so that the one or more financial instruments can be successfully added or linked to the digital wallet for use.

While the embodiments and examples described above involve a reader coil implemented in a mobile computing device, it may be understood that the power to any NFC reader installed in any type of device may be dynamically adjusted to improve NFC communication. Moreover, the above described NDEF messages and corresponding payloads may include message content or data related to various use cases of the contactless card, such as contactless card activation, user verification, user authentication, various transactions, sales, purchases, etc.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a display device;
one or more processors coupled with the display device;
memory coupled with the display device and the one or more processors, the memory storing instructions that, when executed by the one or more processors, causes the one or more processors to:
provide access to a first-party banking application in response to authentication of user login information;
present, by the first-party banking application in a first-display graphical user interface (GUI) on the display device, an indication to add or link a payment card associated with a user and the account to a third-party wallet application;
receive, by the first-party banking application, a selection of the indication;
present, by the first-party banking application in the first-display GUI on the display device, a one-tap authentication option for the user to tap a contactless card on or near the apparatus, and wherein the contactless card is the payment card to add or link to the third-party wallet application;
establish a first wireless communication with the contactless card;
receive a message comprising encrypted data and a random number via the first wireless communication from the contactless card, wherein the contactless card generates the message by encrypting the encrypted data and the random number with a session key, wherein the encrypted data comprises a unique identifier associated with the contactless card;
send, by the first-party banking application, at least a portion of the message to one or more remote computing devices associated with a first-party entity;
receive, by the first-party banking application, a second indication from the one or more remote computing devices of a successful authentication based on the portion of the message; and
initiate, by the first-party banking application, a transition to the third-party wallet application, the transition to include sending information for the payment card to the third-party wallet application to add or link to the third-party wallet application, the transition to further include causing the third-party wallet application to display at least confirmation that the payment card has been successfully added or linked to the third-party wallet application in a second-display GUI on the display device.

2. The apparatus of claim 1, wherein the instructions further cause the one or more processors to receive, from the user, permission to share data with the third-party wallet application.

3. The apparatus of claim 1, the one or more processors to:
receive user login information; and
authenticate, via the first-party banking application, the user login information.

4. The apparatus of claim 1, wherein the first-party banking application is a mobile-based application, a native application, a web application, or a web browser and wherein the third-party wallet application is a mobile-based application, a native application, a web application, or a web browser.

5. The apparatus of claim 1, the one or more processors to receive the message in one or more NFC data exchange format (NDEF) messages.

6. The apparatus of claim 1, wherein the contactless card comprises memory and processing circuitry for executing instructions stored in the memory to generate the encrypted data, determine the random number, and send the message.

7. The apparatus of claim 1, wherein the one or more remote computing devices are associated with the first-party banking application and are first-party remote computing devices.

8. A computer-implemented method, comprising:
providing, by a computing device, access to a first-party banking application in response to authentication of user login information;
presenting, by the first-party banking application in a first-display graphical user interface (GUI) on a display device, an indication to add or link a payment card associated with a user and the account to a third-party wallet application;
receiving, by the first-party banking application, a selection of the indication;
presenting, by the first-party banking application in the first-display GUI on the display device, a one-tap authentication option for the user to tap a contactless card on or near the apparatus, and wherein the contactless card is the payment card to add or link to the third-party wallet application;
establishing a first wireless communication with the contactless card;
receiving a message comprising a message authentication code (MAC) cryptogram and a random number via the first wireless communication from the contactless card, wherein the contactless card generates the message by encrypting the MAC cryptogram and the random number with a session key, wherein the MAC cryptogram comprises a unique identifier associated with the contactless card;
sending, by the first-party banking application, at least a portion of the message to one or more remote computing devices associated with the financial entity;
receiving, by the first-party banking application, a second indication from the one or more remote computing devices of a successful authentication based on the portion of the message; and
initiating, by the first-party banking application, a transition to the third-party wallet application, the transition to include sending information for the payment card to the third-party wallet application to add or link to the third-party wallet application, the transition to further include causing the third-party wallet application to display at least confirmation that the payment card has been successfully added or linked to the third-party wallet application in a second-display GUI on the display device.

9. The computer-implemented method of claim 8, comprising receiving, from the user, permission to share data with the third-party wallet application.

10. The computer-implemented method of claim 8, comprising:
receiving user login information; and
authenticating, via the first-party banking application, the user login information.

11. The computer-implemented method of claim 8, wherein the first-party banking application is a mobile-based application, a native application, a web application, or a web browser and wherein the third-party wallet application is a mobile-based application, a native application, a web application, or a web browser.

12. The computer-implemented method of claim 8, comprising receiving the message in one or more NFC data exchange format (NDEF) messages.

13. The computer-implemented method of claim 8, wherein the contactless card comprises memory and processing circuitry for executing instructions stored in the memory to generate the MAC cryptogram, determine the random number, and send the message.

14. The computer-implemented method of claim 8, wherein the one or more remote computing devices are associated with the first-party banking application and are first-party remote computing devices.

15. A non-transitory computer-readable storage medium, the computer-readable storage medium including instructions that when executed by a computer, cause the computer to:
provide access to a first-party banking application in response to authentication of user login information;
present, by the first-party banking application in a first-display graphical user interface (GUI) on the display device, an indication to add or link a payment card associated with a user and the account to a third-party wallet application;
receive, by the first-party banking application, a selection of the indication;
present, by the first-party banking application in the first-display GUI on the display device, a one-tap authentication option for the user to tap a contactless card on or near the apparatus, and wherein the contactless card is the payment card to add or link to the third-party wallet application;
establish a first wireless communication with the contactless card;
receive a message comprising a message authentication code (MAC) cryptogram and a random number via the first wireless communication from the contactless card, wherein the contactless card generates the message by encrypting the MAC cryptogram and the random number with a session key, wherein the MAC cryptogram comprises a unique identifier associated with the contactless card;
send, by the first-party banking application, at least a portion of the message to one or more remote computing devices associated with a first-party entity;
receive, by the first-party banking application, a second indication from the one or more remote computing devices of a successful authentication based on the portion of the message; and
initiate, by the first-party banking application, a transition to the third-party wallet application, the transition to include sending information for the payment card to the third-party wallet application to add or link to the third-party wallet application, the transition to further include causing the third-party wallet application to display at least confirmation that the payment card has been successfully added or linked to the third-party wallet application in a second-display GUI on the display device.

16. The computer-readable storage medium of claim 15, comprising receive, from the user, permission to share data with the third-party wallet application.

17. The computer-readable storage medium of claim 15, comprising:
receive user login information; and
authenticate, via the first-party banking application, the user login information.

18. The computer-readable storage medium of claim 15, wherein the first-party bank application is a mobile-based application, a native application, a web application, or a web browser and wherein the third-party wallet application is a mobile-based application, a native application, a web application, or a web browser.

19. The computer-readable storage medium of claim 15, comprising receive the message in one or more NFC data exchange format (NDEF) messages.

20. The computer-readable storage medium of claim 15, wherein the contactless card comprises memory and process circuitry for executing instructions stored in the memory to generate the MAC cryptogram, determine the random number, and send the message.

* * * * *